(12) United States Patent
Hsiao et al.

(10) Patent No.: US 10,698,762 B2
(45) Date of Patent: Jun. 30, 2020

(54) DATA READING METHOD AND STORAGE CONTROLLER

(71) Applicant: SHENZHEN EPOSTAR ELECTRONICS LIMITED CO., Shenzhen OT (CN)

(72) Inventors: Yu-Hua Hsiao, Hsinchu County (TW); Shu-Hsien Li, Kaohsiung (TW); Hsiu-Hsien Chu, Hsinchu (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 303 days.

(21) Appl. No.: 15/684,945

(22) Filed: Aug. 24, 2017

(65) Prior Publication Data

US 2019/0012228 A1 Jan. 10, 2019

(30) Foreign Application Priority Data

Jul. 7, 2017 (TW) .............................. 106122810 A

(51) Int. Cl.
*G06F 11/00* (2006.01)
*G06F 11/10* (2006.01)
*G06F 11/07* (2006.01)

(52) U.S. Cl.
CPC ........ *G06F 11/1048* (2013.01); *G06F 11/073* (2013.01); *G06F 11/076* (2013.01); *G06F 11/0727* (2013.01); *G06F 11/0757* (2013.01)

(58) Field of Classification Search
CPC ............ G06F 11/1048; G06F 11/0727; G06F 11/073; G06F 11/0757; G06F 11/076
See application file for complete search history.

(56) References Cited

U.S. PATENT DOCUMENTS

| | | | | |
|---|---|---|---|---|
| 9,711,231 | B1 * | 7/2017 | Yip ........................ | G11C 16/28 |
| 9,934,859 | B1 * | 4/2018 | Swaminathan ........ | G11C 16/10 |
| 2015/0370493 | A1 * | 12/2015 | Choi ..................... | G06F 3/0619 |
| | | | | 711/103 |
| 2017/0062070 | A1 * | 3/2017 | Moon ................ | G11C 16/3495 |

* cited by examiner

*Primary Examiner* — Katherine Lin
(74) *Attorney, Agent, or Firm* — JCIPRNET

(57) ABSTRACT

A data reading method for a rewritable non-volatile memory module is provided. The method includes receiving a reading command from a host system; identifying a target physical unit of the rewritable non-volatile memory module according to the reading command, and identifying a program erase cycle value, a first timestamp, a second timestamp of the target physical unit, wherein the first timestamp records a time at which the target physical unit is programmed last, and the second timestamp records a time at which the target physical unit is read last; and selecting a target reading voltage set among a plurality of reading voltage set according to the program erase cycle value, the first timestamp, the second timestamp, so as to read a target data from the target physical unit.

8 Claims, 5 Drawing Sheets

| program erase cycle value | first time value | second time value | Target reading voltage value |
|---|---|---|---|
| $<X$ | $<Z$ |  | $VS_1$ |
|  | $<Y$ & $\geq Z$ | $<Z$ | $VS_2$ |
|  | | $\geq Z$ | $VS_3$ |
|  | $\geq Y$ | $<Z$ | $VS_4$ |
|  | | $\geq Z$ | $VS_5$ |
| $\geq X$ | $<Z$ |  | $VS_5$ |
|  | $<Y$ & $\geq Z$ | $<Z$ | $VS_6$ |
|  | | $\geq Z$ | $VS_7$ |
|  | $\geq Y$ | $<Z$ | $VS_7$ |
|  | | $\geq Z$ | $VS_8$ |

X : program erase cycle threshold value
Y : first time threshold value
Z : second time threshold value
Y > Z

FIG. 4

DATA READING METHOD AND STORAGE CONTROLLER

CROSS-REFERENCE TO RELATED APPLICATION

This application claims the priority benefit of Taiwan application serial no. 106122810, filed on Jul. 7, 2017. The entirety of the above-mentioned patent application is hereby incorporated by reference herein and made a part of this specification.

BACKGROUND OF THE INVENTION

Field of the Invention

The invention is related to a data reading method, and particularly to a data reading method adapted to a storage device equipped with a rewritable non-volatile memory module and a storage controller.

Description of Related Art

Generally speaking, when reading data from a rewritable non-volatile memory module, if a page-read failure does not occur, a system uses a predetermined reading voltage set or an optimized reading voltage set that is previously used to read the data. Only when a read failure event occurs the system (storage system) does not use the predetermined reading voltage set or the optimized voltage that is previously used and adjusts the reading voltage set correspondingly.

In other words, the optimized reading voltage set value of the rewritable non-volatile memory module is not fixed. However, conventionally, it is a passive approach to adjust the reading voltage set so as to acquire the optimized reading voltage set to read the data. That is, only when the read failure event occurs the reading voltage set of a different voltage value is used to re-read the data so as to find the optimized reading voltage set according to the read result. However, the above-mentioned operation causes the data-reading operation to be carried out for a number of times, and thus seriously affecting the data-reading efficiency and reducing data-accessing speed.

In particular, if the rewritable non-volatile memory module is a 3D NAND flash memory module and reads data from one of physical units after a time period, the read error rate is high, causing that the read data cannot be corrected, and thus read error occurs. Accordingly, it is an issue for persons skilled in the art to find out how to actively search for the optimized reading voltage set corresponding to the data to be read before reading the data so as to reduce the read error rate while avoiding the problem of read error caused by the 3D NAND flash memory module, thereby improving the reading efficiency of the rewritable non-volatile memory module.

SUMMARY OF THE INVENTION

The invention provides a data reading method and a storage controller, which is capable of searching for the optimized reading voltage set according to the information of a physical unit corresponding to a read command in a rewritable non-volatile memory module so as to read the data, thereby efficiently executing the read command and reducing read error rate.

An embodiment of the invention provides a data reading method adapted to a storage device disposed with a rewritable non-volatile memory module, wherein the rewritable non-volatile memory module includes a plurality of physical units. The method includes receiving a read command from a host system, wherein the read command instructs to read a target data; identifying a target physical unit storing the target data stored in the rewritable non-volatile memory module according to the read command, and identifying a program erase cycle value, a first timestamp and a second timestamp of the target physical unit, wherein the first timestamp records a time at which the target physical unit is written last, and the second timestamp records a time at which the target physical unit is read last; and selecting a target reading voltage set among a plurality of reading voltage sets according to the program erase cycle value, the first timestamp and the second timestamp of the target physical unit so as to read the target data from the target physical unit by using the target reading voltage set.

An embodiment of the invention provides a storage controller used for controlling a storage device disposed with a rewritable non-volatile memory module, wherein the rewritable non-volatile memory module includes a plurality of physical units. The storage controller includes a connection interface circuit, a memory interface control circuit, a processor and a data management circuit. The connection interface circuit is coupled to a host system. The memory interface control circuit is coupled to the rewritable non-volatile memory module. The processor is coupled to the connection interface circuit and the memory interface control circuit. The data management circuit is coupled to the processor, the connection interface circuit and the memory interface control circuit. The processor receives a read command from the host system, wherein the read command instructs to read a target data, wherein the processor further identifies a target physical unit storing the target data stored in the rewritable non-volatile memory module according to the read command, and identifies a program erase cycle value, a first timestamp and a second timestamp of the target physical unit, wherein the first timestamp records a time at which the target physical unit is written last, and the second timestamp records a time at which the target physical unit is read last, wherein the processor further selects a target reading voltage set among a plurality of reading voltage sets according to the program erase cycle value, the first timestamp and the second timestamp of the target physical unit so as read the target data from the target physical unit by using the target reading voltage set.

In summary, the data reading method and the storage controller provided in the embodiments of the invention is capable of identifying a target physical unit in the rewritable non-volatile memory module corresponding to the read command according to the received read command, and identifying the program erase cycle value, the first timestamp and the second timestamp of the target physical unit so as to read the target data from the target physical unit by directly using the reading voltage corresponding to the state of the target physical unit in a condition of executing one time of reading operation, thereby improving the reading efficiency and accuracy.

In order to make the aforementioned features and advantages of the invention more comprehensible, embodiments accompanying figures are described in detail below.

BRIEF DESCRIPTION OF THE DRAWINGS

FIG. 4 is a rule table of selecting a target reading voltage set according to one embodiment of the invention.

DESCRIPTION OF EMBODIMENTS

In the embodiment, a storage device includes a rewritable non-volatile memory module and a storage controller (also referred to as storage controller or a storage control circuit). In addition, the storage device is used together with a host system such that the host system can write data into the storage device or read data from the storage device.

Figure 1:
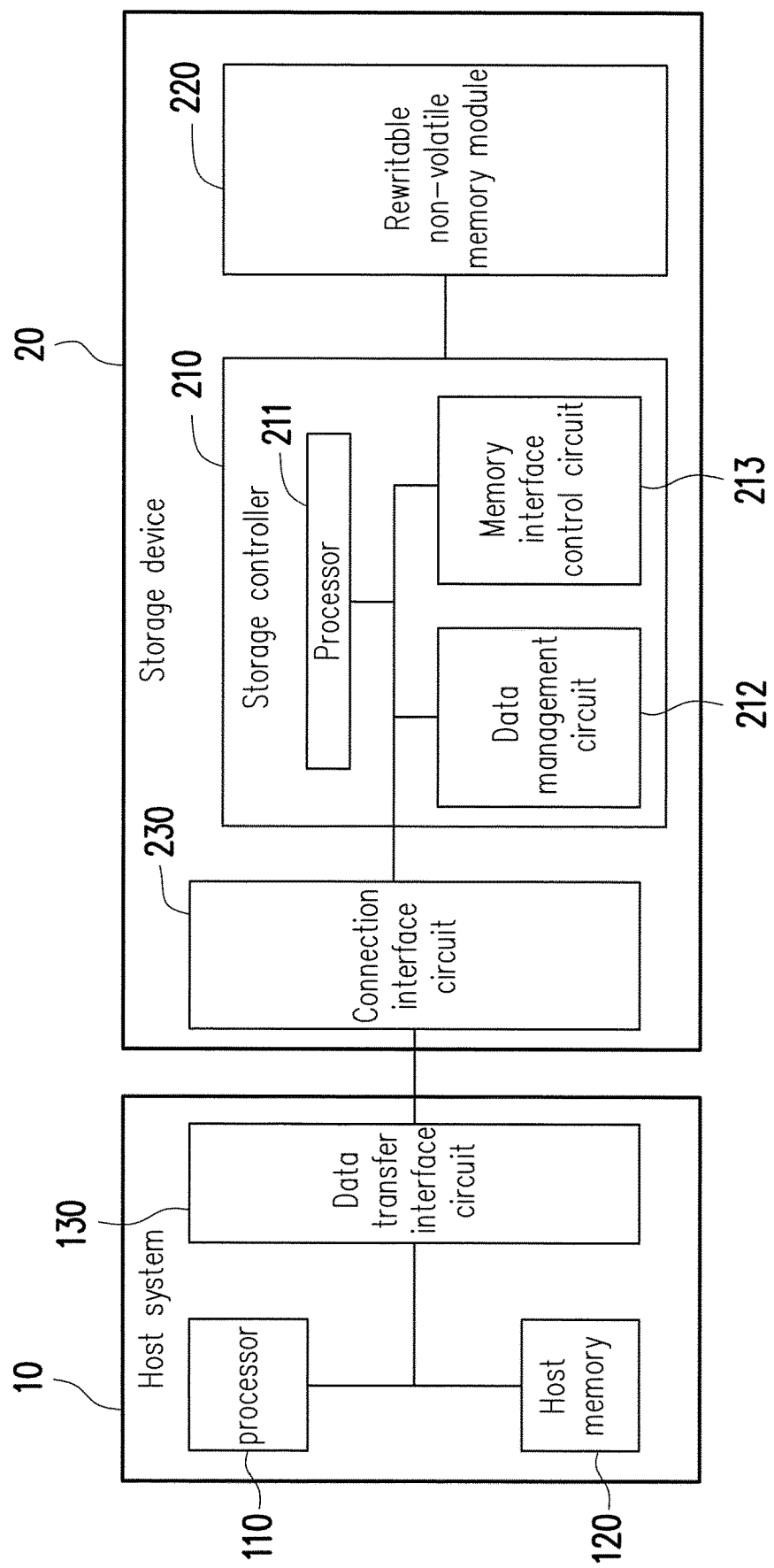
FIG. 1 is a block schematic diagram of a host system and a storage device according to one embodiment of the invention.

FIG. 1 is a block schematic diagram of a host system and a storage device according to one embodiment of the invention.

Referring to FIG. 1, a host system 10 includes a processor 110, a host memory 120 and a data transfer interface circuit 130. In the embodiment, the data transfer interface circuit 130 is coupled to (also referred to as electrically connected to) the processor 110 and the host memory 120. In another embodiment, the processor 110, the host memory 120 and the data transfer interface circuit 130 are coupled to one another using a system bus.

A storage device 20 includes a storage controller 210, a rewritable non-volatile memory module 220 and a connection interface circuit 230. The storage controller 210 includes a processor 211, a data management circuit 212 and a memory interface control circuit 213.

In the embodiment, the host system 10 is coupled to the storage device 20 via the data transfer interface circuit 130 and the connection interface circuit 230 of the storage device 20 to perform data-accessing operation. For example, the host system 10 may store the data in the storage device 20 or read data from the storage device 20 via the data transfer interface circuit 130.

In the embodiment, the processor 110, the host memory 120 and the data transfer interface circuit 13 may be disposed on a motherboard of the host system 10. The number of the data transfer interface circuit 130 may be one or more. Via the data transfer interface circuit 130, the motherboard may be coupled to the storage device 20 in a wired or a wireless manner. The storage device 20 may be, for example, a flash drive, a memory card, a solid state drive (SSD) or a wireless memory storage device. The wireless memory storage device may be a memory storage device using various wireless communication technologies such as a near field communication (NFC) memory storage device, a WiFi memory storage device, a Bluetooth memory storage device or a low-power consumption Bluetooth memory storage device (e.g., iBeacon) and so on. In addition, the motherboard may be coupled to various I/O devices such as a global positioning system (GPS) module, a network interface card, a wireless transfer device, a keyboard, a screen, a speaker and so on via the system bus.

In the embodiment, the data transfer interface circuit 130 and the connection interface circuit 230 are interface circuits that are compatible with the Peripheral Component Interconnect Express (PCI Express) standard. Meanwhile, the transfer of data between the data transfer interface circuit 130 and the connection interface circuit 230 is performed by using a Non-Volatile Memory express (NVMe) communication protocol.

However, it should be understood that the invention is not limited thereto. The data transfer interface circuit 130 and the connection interface circuit 230 may comply with the Parallel Advanced Technology Attachment (PATA) standard, the Institute of Electrical and Electronic Engineers (IEEE) 1394 standard, the Serial Advanced Technology Attachment (SATA) standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the Multi-Chip Package interface standard, the Multi Media Card (MMC) interface standard, the eMMC interface standard, the Universal Flash Storage (UFS) interface standard, the eMCP interface standard, the CF interface standard, the Integrated Device Electronics (IDE) standard or other suitable standards. In addition, in another embodiment, the connection interface circuit 230 may be packaged in one chip along with the storage controller 210; alternatively, the connection interface circuit 230 may be disposed outside a chip containing the storage controller 210.

In the embodiment, the host memory 120 is used for temporarily storing the command or data executed by the processor 110. For example, in the exemplary embodiment, the host memory 120 may be a dynamic random access memory (DRAM), a static random access memory (SRAM) and so on; but it should be indicated that the invention is not limited thereto. The host memory 120 may be other suitable memories.

The storage controller 210 is used for executing a plurality of logic gates or control commands implemented in a hardware form or a firmware form, and perform data writing, data reading and data erasing operations in the rewritable non-volatile memory module 220 according to the command of the host system 10.

More specifically, the processor 211 of the storage controller 210 is a hardware that has a computing capability for controlling the overall operation of the storage controller 210. Specifically, the processor 211 includes a plurality of control commands. The control commands are executed to perform data writing, data reading and data erasing operations when the storage device 20 is operated.

It should be mentioned that, in the embodiment, the processor 110 and processor 211 are, for example, a central processing unit (CPU), a micro-processor, or other programmable unit (Microprocessor), a digital signal processor (DSP), a programmable controller, an application specific integrated circuit (ASIC), a programmable logic device (PLD) or other similar circuit component, which should not be construed as a limitation to the invention.

In one embodiment, the storage controller 210 further includes a read-only memory (not shown) and a random access memory (not shown). In particular, the read-only memory has a boot code. When the storage controller 210 is enabled, the processor 211 executes the boot code first to load the control command stored in the rewritable non-volatile memory module 220 into the random access memory of the storage controller 210. Thereafter, the processor 211 runs the control commands to perform data writing, data reading and data erasing operations and the like. In another embodiment, the control command of the processor 211 may be stored in a specific area of the rewritable non-volatile memory module 220, for instance, in a physical storage unit in the rewritable non-volatile memory module 220 that is specifically for storing system data, as a program code.

In the embodiment, as described above, the storage controller 210 further includes the data management circuit 212 and the memory interface control circuit 213. It should be pointed out that the operation executed by each component of the storage controller 220 may be regarded as the operation executed by the storage controller 220.

Specifically, the data management circuit 212 is coupled to the processor 211, the memory interface control circuit 213 and the connection interface circuit 230. The data management circuit 212 receives the command of the processor 211 to perform transfer of data. For example, data is read from the host system 10 (e.g. host memory 120) via the connection interface circuit 230, and the read data is written into the rewritable non-volatile memory module 220 via the memory interface control circuit 213 (e.g., perform writing operation according to the write command from the host system 10). In another example, the data is read from one or more physical units of the rewritable non-volatile memory module 220 via the memory interface control circuit 213, and the read data is written into the host system 10 via the connection interface circuit 230 (e.g., perform reading operation according to the read command from the host system 10). In another embodiment, the data management circuit 212 may be integrated into the processor 211.

The memory interface control circuit 213 receives the command of the processor 211, and performs the writing (also referred to as programming) operation, reading operation or erasing operation to the rewritable non-volatile memory module 220 in cooperation with the data management circuit 212.

For example, the processor 211 may execute a write command sequence to instruct the memory interface control circuit 213 to write the data into the rewritable non-volatile memory module 220; the processor 211 may execute a read command sequence to instruct the memory interface control circuit 213 to read data from one or more physical units (also referred to as target physical unit) of the rewritable non-volatile memory module 220 corresponding to the read command; the processor 211 may execute an erase command sequence to instruct the memory interface control circuit 213 to perform erasing operation on the rewritable non-volatile memory module 220. The write command sequence, the read command sequence and the erase command sequence may respectively include one or more program codes or command codes, and are used for instructing to perform corresponding writing, reading and erasing operations on the rewritable non-volatile memory module 220. In one embodiment, the processor 211 may further give other types of command sequence to the memory interface control circuit 213 so as to perform corresponding operations to the rewritable non-volatile memory module 220.

In addition, the data that is to be written into the rewritable non-volatile memory module 220 is converted into a format that can be accepted by the rewritable non-volatile memory module 220 via the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform the corresponding operation. For example, the command sequences may include the write command sequence that instructs to write data, the read command sequence that instructs to read data, the erase command sequence that instructs to erase data and corresponding command sequences for instructing to perform various memory operations (e.g., changing reading voltage set level or executing trash recycle process and the like). The command sequences may include one or more signals or data on a busbar. The signals or data may include a command code or a program code. For example, in the read command sequence, information such as identification code and memory address that are read is included.

The rewritable non-volatile memory module 220 is coupled to the storage controller 210 (memory interface control circuit 213) and stores the data written by the host system 10. The rewritable non-volatile memory module 220 may be other flash memory modules such as a single level cell (SLC) NAND flash memory module (i.e., flash memory module of which one memory cell can store one bit), a multi-level cell (MLC) NAND flash memory module (i.e., flash memory module of which one memory cell can store two bits), a triple level cell (TLC) NAND flash memory module (i.e., flash memory module of which one memory cell can store three bits), a 3D NAND flash memory module or a vertical NAND flash memory module or other memory module that has the same characteristics. The memory cell in the rewritable non-volatile memory module 220 is arranged in a manner of arrays.

In the embodiment, the memory cell of the rewritable non-volatile memory module 220 constructs a plurality of physical programming unit (also referred to as physical sub-unit), and the physical programming units construct a plurality of physical blocks (also referred to as physical erasing unit or physical unit). Specifically, the memory cells on the same word line (or the same word line layer) form one or more physical programming units.

In the embodiment, the physical sub-unit serves as the minimum unit for writing (programming) data. The physical unit is the minimum unit for erasing operation, that is, each physical unit includes a smallest number of memory cell that is erased altogether. Each physical unit includes a plurality of physical sub-units. The physical sub-unit may be a physical page or a physical sector. In the embodiment, the physical sub-unit includes a data bit area and a redundancy bit area. The data bit area stores user data, and the redundancy bit area stores system data. The system data is, for example, an error correction code, and an error check code or meta data; however, the invention is not limited thereto. For example, in another embodiment, the data transfer method described in the embodiment may be changed to be applied to the rewritable non-volatile memory module 220 that uses the physical unit as the minimum storage unit for writing data.

It should be noted that, in the embodiment, the system data for recording the information of one physical unit may record by using one or more physical sub-units in the physical unit, or record by using one or more physical sub-units of a specific physical unit in one system area that record all system data. In the embodiment, the system data corresponding to one physical unit includes information such as a program erase cycle (PEC) value, a last write timestamp (LWT), a last read timestamp (LRT) of the physical unit. The values (difference) of the timestamps may be used to represent sequence of time thereof. The invention provides no limitation to the detailed format of the timestamp. More specifically, every time when the processor 211 performs erasing operation on one physical unit, after the erasing operation is completed, the processor 211 adds one to the program erase cycle value corresponding to the current physical unit (e.g., the program erase cycle value is increased from 0 along with each erasing operation). In other words, the program erase cycle value can reflect the sum of times that the corresponding physical unit is erased. In addition, every time when one erasing operation is performed on the physical unit, the processor 211 resets the last write timestamp (also referred to as first timestamp) of the physical unit. For example, after the erasing operation is completed, the value of the first timestamp is recorded as the current time (i.e., local time at which the erasing operation is completed). Also, every time when the writing operation is performed on the physical unit, the processor 211 updates the first timestamp of the physical unit as a time at which the physical unit performs writing operation. In other words, the first timestamp corresponding to one physical unit represents the time (e.g., local time at which the last writing operation is completed) at which the physical unit is written last. The writing operation is, for example, performed by programming data into one or more physical sub-units of the physical unit, or for example, programming data into other forms of physical address of the physical unit.

Likewise, every time when one erasing operation is performed to one physical unit, the processor 211 resets the last read timestamp (also referred to as second timestamp) of the physical unit as the current time. That is, when the erasing operation is completed, the value of the second timestamp is recorded as the current time (i.e. local time at which the erase operation is completed). Moreover, every time when the read operation is performed on the physical unit, the processor 211 updates the second timestamp of the physical unit as the time at which the physical unit performs the read operation. That is, the second timestamp corresponding to one physical unit represents the time at which the physical unit is read last (e.g., local time at which the last read operation is completed). The reading operation is performed by, for example, reading data from one or more physical sub-units of the physical unit, or for example, by reading data from other forms of one or more physical addresses of the physical unit.

In the following embodiments, one physical block serves as one physical unit for exemplary purpose. However, in another embodiment, one physical unit may be formed by any number of memory cell(s) depending on practical needs. Moreover, it should be pointed out that, when the storage controller 211 divides the memory cells (or physical units) in the rewritable non-volatile memory module 220 into groups to perform corresponding management operation, the memory cells (or physical units) are divided logically, but the actual positions thereof are not changed.

The storage controller 210 allocates a plurality of logical units to the rewritable non-volatile memory module 220. The host system 10 accesses the user data stored in the plurality of physical units via the allocated logical units. Here, each of the logical units may be formed by one or more logical addresses. For example, the logical unit may be a logical block, a logical page or a logical sector. One logical unit may be mapped to one or more physical units, wherein the physical unit may be one or more physical addresses, one or more physical sectors, one or more physical programming units or one or more physical erasing units. In the embodiment, the logical unit is a logical block, and the logical sub-unit is a logical page. Each of the logical units has a plurality of logical sub-units.

Furthermore, the storage controller 210 establishes a logical to physical address mapping table and a physical to logical address mapping table so as to record a mapping relationship between the logical unit (e.g., logical block, logical page or logical sector) and physical unit (e.g., physical erasing unit, physical programming unit, physical sector) that are allocated to the rewritable non-volatile memory module 220. That is to say, the storage controller 210 may find the physical unit mapped by one logical unit via the logical to physical address mapping table, and the storage controller 210 may find the logical unit mapped by one physical unit via the physical to logical address mapping table. However, the above concept regarding mapping the logical unit and the physical unit is a conventional technical means known to persons skilled in the art, and thus no further descriptions are incorporated herein.

In one embodiment, the storage controller 210 further includes a buffer memory and a power management circuit. The buffer memory is coupled to the processor 211 for temporarily storing the data and command from the host system 10, the data from the rewritable non-volatile memory module 220 or other system data for managing the storage device 20, such that the processor 211 can access the data, command or system data quickly from the buffer memory. The power management circuit is coupled to the processor 211 for controlling the power of the storage device 20.

Figure 2:
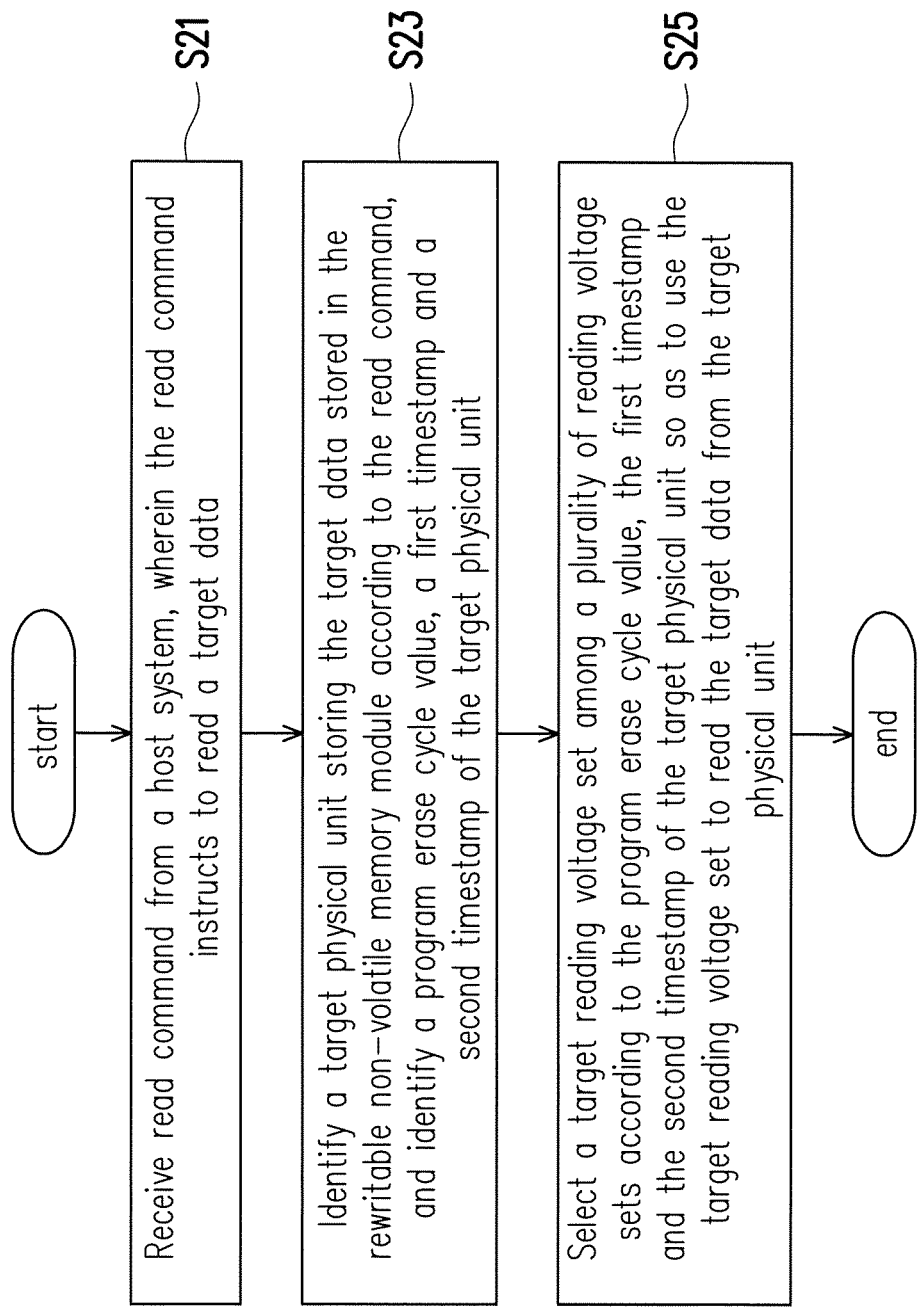
FIG. 2 is a flowchart of a data reading method according to one embodiment of the invention.

FIG. 2 is a flowchart of a data reading method according to one embodiment of the invention.

Referring to FIGS. 1 and 2, in step S21, the processor 211 receives the read command from the host system 10, wherein the read command instructs to read the target data. Specifically, when the processor 211 receives the read command, the processor 211 acquires the logical address where the target data is stored according to the read command, and acquires the physical address in the rewritable non-volatile memory module where the target data is stored according to the logical to physical address mapping table.

Next, in step S23, the processor 211 identifies the target physical unit storing the target data in the rewritable non-volatile memory module according to the read command, and identifies the program erase cycle value, the first timestamp and the second timestamp of the target physical unit. As mentioned above, the processor 211 may acquire the physical address (i.e., the physical address where the target data is stored) corresponding to the read command according to the read command. Additionally, the processor 211 can identify the physical unit in which the physical address is located; that is, the processor 211 can identify the physical unit to which the physical address belongs, and such physical unit (also referred to as target physical unit) is the physical unit in which the target data is stored. Subsequently, after the target physical unit is identified, the processor 211 can read the system data corresponding to the target physical unit so as to identify (acquire) the program erase cycle value, the first timestamp and the second timestamp of the target physical unit.

In step S25, the processor 211 selects the target reading voltage set among the plurality of (different) reading voltage sets according to the program erase cycle value, the first timestamp and the second timestamp of the target physical unit so as to read the target data from the target physical unit by using the target reading voltage set. Details of the step S25 are described below with illustration of FIG. 3. It should be mentioned that, in the embodiment, a 3D TLC NAND flash memory module is used to serve as an example for description.

Figure 3:
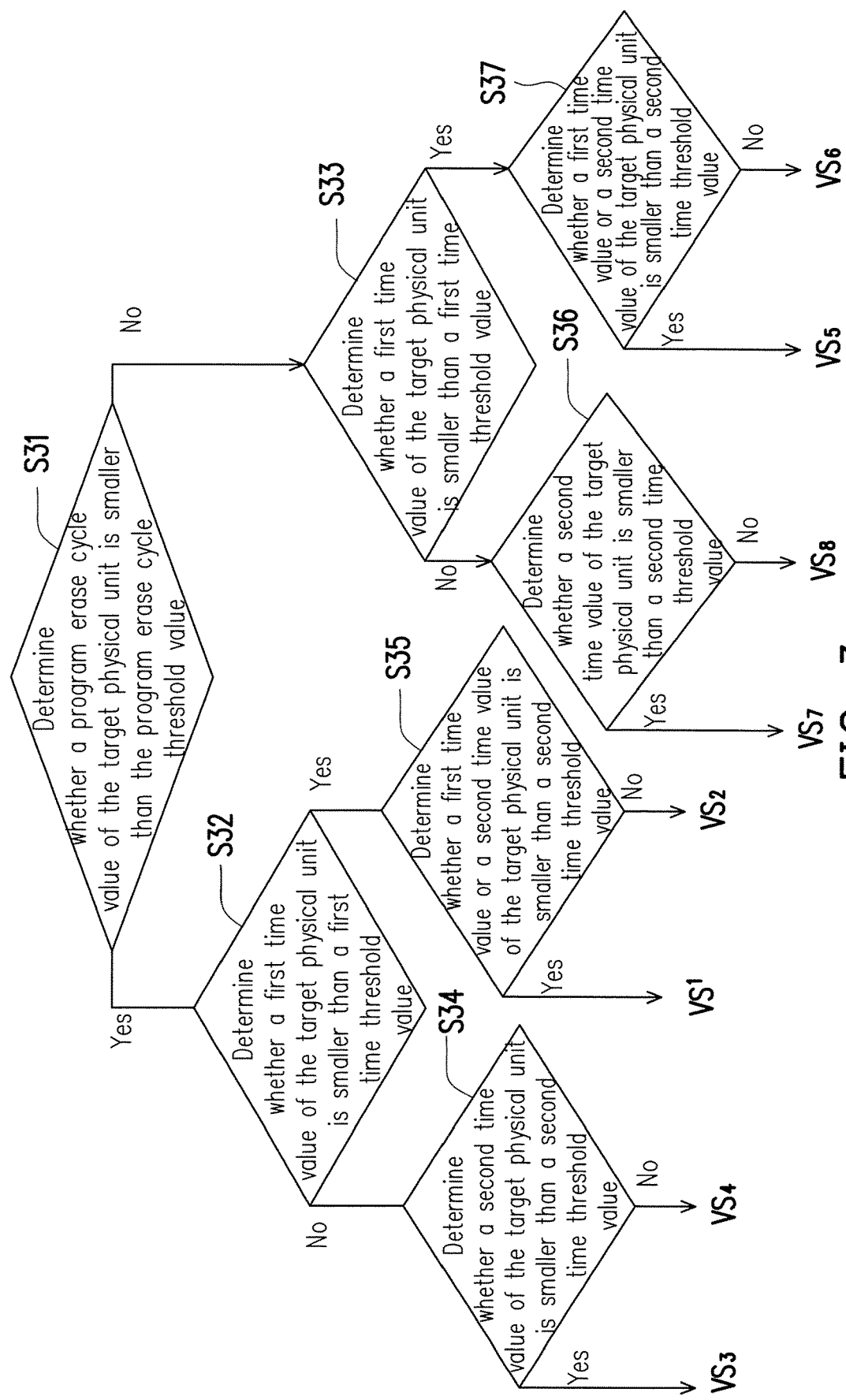
FIG. 3 is a flowchart of selecting a target reading voltage set according to one embodiment of the invention.

FIG. 3 is a flowchart illustrating selecting a target reading voltage set according to one embodiment of the invention. After acquiring the program erase cycle value, the first timestamp and the second timestamp of the target physical unit, the processor 211 uses a difference value obtained by subtracting the first timestamp from the current time as a first time value, and uses a difference value obtained by subtracting the second timestamp from the current time as a second time value. The current time refers to a current local time at which the processor 211 receives and executes the read command. In other words, the first time value (also referred to as retention time) may represent a time length counted from the last writing operation of the target physical unit, and the second time value (also referred to as reading time interval) may represent a time length counted from the last reading operation of the target physical unit. Thereafter, the processor 211 selects the target reading voltage set among the plurality of reading voltage sets by comparing the program erase cycle value of the target physical unit with a program erase cycle threshold value, comparing the first time value with a first time threshold value, comparing the second time value with a second time threshold value, wherein the first time threshold value is larger than the second time threshold value.

More specifically, the processor 211 selects one of eight reading voltage sets (e.g., a first reading voltage set $VS_1$, a second reading voltage set $VS_2$, a third reading voltage set $VS_3$, a fourth reading voltage set $VS_4$, a fifth reading voltage set $VS_5$, a sixth reading voltage set $VS_6$, a seventh reading voltage set $VS_7$, an eighth reading voltage set $VS_8$) as the target reading voltage set according to the program erase cycle value, the first time value and the second time value of the target physical unit. In addition, since FIG. 3 is illustrated by using the 3D TLC NAND flash memory module as an example, in order to read the data stored in the TLC memory cell, the selected the reading voltage set includes seven different voltage values (also referred to as reading voltage value), and the processor 211 may read data from the memory cell of the 3D TLC NAND flash memory module by using the seven different reading voltage values.

Referring to FIG. 3, for example, in step S31, the processor 211 determines whether the program erase cycle value of the target physical unit is smaller than the program erase cycle threshold value. The manufacturer may preset the program erase cycle threshold value according to the specification or physical properties of the rewritable non-volatile memory module. If it is determined that the program erase cycle value of the target physical unit is smaller than the program erase cycle threshold value, for example, the wearing-out of the target physical unit does not achieve a particular degree of wearing-out (each erasing operation causes wearing-out of the physical unit), in step S32, the processor 211 determines whether the first time value of the target physical unit is smaller than the first time threshold value (also referred to as retention time threshold value). In other words, the processor 211 may determine whether the retention time of the data that is written into the target psychical unit is larger than or equal to a particular retention time (i.e. the retention time threshold value) accordingly.

If it is determined that the first time value of the target physical unit is not smaller than the first time threshold value, in step S34, the processor 211 determines whether the second time value of the target physical unit is smaller than the second time threshold value (also referred to as reading time interval threshold value). In other words, the processor 211 can determine whether the time since which the reading operation is previously performed to the target physical unit is larger than or equal to a particular reading time interval (i.e., reading time interval threshold value). If it is determined that the second time value of the target physical unit is smaller than the second time threshold value, the processor 211 selects the third reading voltage set $VS_3$ among the plurality of reading voltage sets as the target reading voltage set (i.e., step S34➔YES ➔ $VS_3$). On the other hand, in step S34, if it is determined that the second time value of the target physical unit is not smaller than the second time threshold value, the processor 211 selects the fourth reading voltage set $VS_4$ among the plurality of reading voltage sets as the target reading voltage set (i.e., step S34➔NO➔ $VS_4$).

It should be mentioned that, in the embodiment, the time interval (e.g., first time value) between the previous writing operation and the current reading operation to be performed also affects the accuracy of the data to be read in the current reading operation. Therefore, when the first time value is smaller than the first time threshold value, the embodiment also takes the first time value that is smaller than the first time threshold value into consideration, that is, determines whether the first time value smaller than the first time threshold value is smaller than the second time threshold value. For example, if the first time value is smaller than the second time threshold value, the last writing operation before the current reading operation also causes the current reading operation not to generate a first read issue (details of first read issue are described below), such that the processor 211 can perform the current reading operation by using the reading voltage set that is not adjusted for the first read issue. Therefore, in the condition that the first time value is smaller than the first time threshold value, the processor 211 further determines whether the first time value is smaller than the second time threshold value so as to determine the reading voltage set to be selected. For example, in step S32, if the processor 211 determines that the first time value of the target physical unit is smaller than the first time threshold value, proceed to step S35, the processor 211 determines whether the first time value or the second time value of the target physical unit is smaller than the second time threshold value. If the first time value of the target physical unit is smaller than the second time threshold value, or the second time value of the target physical unit is smaller than the second time threshold value (i.e., one of the first time value or the second time value is smaller than the second time threshold value), the processor 211 selects the first reading voltage set $VS_1$ among the plurality of reading voltage sets as the target reading voltage set (i.e., step S35➔YES ➔ $VS_1$). On the other hand, in step S35, if the first time value and the second time value of the target physical unit are both not smaller than the second time threshold value, the processor 211 selects the second reading voltage set $VS_2$ among the plurality of reading voltage sets as the target reading voltage set (i.e., step S35➔NO➔ $VS_2$).

In the manner described above, through steps S31 to S37, the processor 211 can determine (select) one of the plurality of the reading voltage sets $VS_1$-$V_8$ as the target reading voltage set corresponding to the state of the target physical unit according to the program erase cycle value, the first time value and the second time value (as well as the program erase cycle threshold value, the first time threshold value and the second time threshold value for comparison) of the target physical unit. Next, after the target reading voltage set is selected, the processor 211 can directly use the determined (selected) target reading voltage set to read the target data from the target physical unit. That is, the processor 211 can directly use the plurality of reading voltage values in the target reading voltage set to read the target data from the target physical unit. In this manner, the processor 211 can directly select the suitable reading voltage to read the data accurately, and there is no need for the processor 211 to adjust the amount of the reading voltage until the data can be read accurately due to the uncorrectable error of the read data, thereby improving the efficiency of reading operation (because a plurality times of reading operation, adjusting operation of reading voltage or additional data correction operation can be avoided).

FIG. 4 is a rule table of selecting target reading voltage set according to one embodiment of the invention.

Referring to FIG. 4, briefly, the processor 211 may look up in a table such as a rule table illustrated in FIG. 4 to select the target reading voltage set among the plurality of reading voltage sets ($VS_1 \sim VS_8$). Specifically, assuming that the processor 211 identifies the program erase cycle value, the first time value and the second time value of the target physical unit, the processor 211 may look up in the rule table and compare the magnitude relationship between the program erase cycle value and the program erase cycle threshold value (i.e., X), compare the magnitude relationship between the first time value and the first time threshold value (i.e., Y), compare the magnitude relationship between the first time value and the second time threshold value (i.e., Z) and compare the magnitude relationship between the second time value with the second time threshold value to find the corresponding reading voltage set. For example, assuming that the program erase cycle value of the target physical unit is smaller than the program erase cycle threshold value, the first time value of the target physical unit is not smaller than the first time threshold value and the second time value of the target physical unit is smaller than the second time threshold value, the processor 211 can find that the corresponding reading voltage set is the third reading voltage set $VS_3$ according to the rule table, and use the third reading voltage set $VS_3$ as the target reading voltage set, thereby starting performing the current reading operation via the target reading voltage set. It should be pointed out that if the processor 211 determines that program erase cycle value of the target physical unit is smaller than the program erase cycle threshold value and the first time value of the target physical unit is smaller than the second time threshold value, the processor 211 may not determine the magnitude (as represented by diagonal slash) of the second time value of the target physical unit, and directly select the first reading voltage set $VS_1$ among the plurality of reading voltage sets as the target reading voltage set. It is because that, as indicated above, before the current reading operation is performed, assuming that there is a writing operation with a shorter time interval (the first time value is smaller than the second time threshold value), since the aforesaid writing operation causes the first read issue not to be generated, the reading voltage set (e.g., the first reading voltage set or the fifth reading voltage set) that is not adjusted for the first reading issue can be used to perform the current reading operation that is to be performed. Similarly, if the processor 211 determines that the program erase cycle value of the target physical unit is not smaller than the program erase cycle threshold value and the first time value of the target physical unit is smaller than the second time threshold value, the processor 211 may not determine the magnitude of the second time value of the target physical unit, and directly select the fifth reading voltage set $VS_5$ among the plurality of reading voltage sets as the target reading voltage set.

Figure 5:
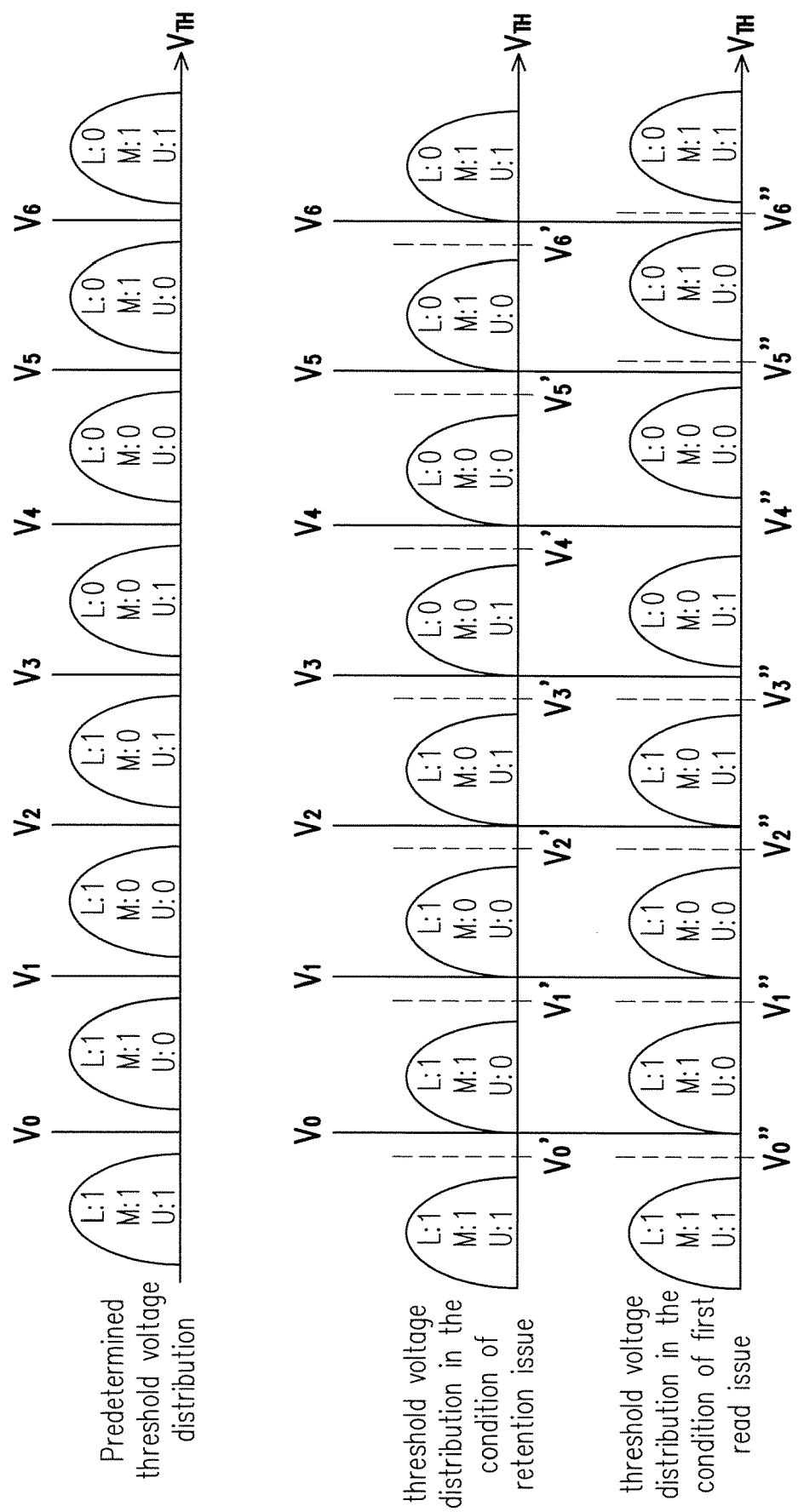
FIG. 5 is a schematic diagram of a threshold voltage distribution and corresponding reading voltage according to one embodiment of the invention.

FIG. 5 is a schematic diagram of a threshold voltage distribution and corresponding reading voltage according to one embodiment of the invention.

Referring to FIG. 5, as indicated above, the processor 211 may use the seven different reading voltage values to read data from the memory cell of the 3D TLC NAND flash memory module. Each of the memory cells of the TLC NAND flash memory module includes three pages to store bit data, including a lower page (L), a middle page (M) and an upper page (U). A gate voltage of each of the memory cells may be categorized into eight storage states, as illustrated in FIG. 5 as "L:1 M:1 U:1", "L:1 M:1 U:0", "L:1 M:0 U:0", "L:1 M:0 U:1", "L:0 M:0 U:1", "L:0 M:0 U:0", "L:0 M:1 U:0" and "L:0 M:1 U:1", according to the predetermined reading voltages $V_0$ to $V_6$ in the predetermined reading voltage set. That is to say, by applying different voltage values of the predetermined reading voltages $V_0$ to $V_6$ to one memory cell, the processor 211 can determine that the data stored in the memory cell is "111", "110", "100", "101", "001", "000", "010" or "011" according to whether the channel of the memory cell is turned on.

For example, assuming that the predetermined threshold voltage distribution of one memory cell after manufacturing is as shown in the upper part of FIG. 5, the processor 211 can use the predetermined reading voltages $V_0$ to $V_6$ in the predetermined reading voltage sets to accurately determine the state (i.e., bit value) (of the bit) stored in the memory cell, namely, determine the data stored in the memory cell.

However, when the memory cell is written (programmed) with data and the data is retained (e.g., the memory cell is no longer been written with data for a long period of time) for a long period of time (also referred to as first time threshold value), the threshold voltage distribution of the memory cell generates a so-called retention issue. If one memory cell occurs the retention issue, the threshold voltage distribution of the memory cell is as shown in the middle part of FIG. 5. As compared with the predetermined threshold voltage distribution, the overall threshold voltage distribution of the memory cell that occurs the retention issue is shifted to the left. Accordingly, if the predetermined reading voltages $V_0$ to $V_6$ in the predetermined reading voltage set are continuously used to read data from the memory cell (that occurs the retention issue), it would like cause an error of the determined bit state of the memory cell. In other words, it is required that the processor 211 to adjust the predetermined reading voltage $V_0$ to $V_6$ as the reading voltages $V_0'$ to $V_6'$ so as to accurately read the memory cell that is in the retention state (occurs the retention issue). That is, as shown in the middle part of FIG. 5, the voltage value of the reading voltages $V_0'$ to $V_6'$ after adjustment may be close to a voltage interval midline (as illustrated in dashed lines) between every two adjacent threshold voltage distributions.

In addition, the 3D memory cell further has the problem of "first read issue". The processor 211 cannot use the predetermined reading voltage set to accurately read the memory cell having the "first read issue". More specifically, if one physical unit of the 3D TLC NAND flash memory module is read after the data is written for a particular period of time (also referred to as the second time threshold value) (i.e., the time length counted from the previous reading operation exceeds a particular value), the threshold voltage of the memory cell of the physical unit is shifted to the left or right irregularly; such phenomenon is called the first read issue. However, if the time interval between two reading operations performed on one physical unit is smaller than the second time threshold value, although the first reading operation via the predetermined reading voltage set causes error of the read data, the data read in the second reading operation via the predetermined reading voltage set is correct. In other words, under the circumstances that the time interval between two reading operations (e.g., the first reading operation and the second reading operation) is smaller than the second time threshold value, the read data of the former reading operation (e.g., the first reading operation) generates a large amount of errors (the read data of the later reading operation is much more correct), and such phenomenon may be called as the first read issue. That is to say, under the circumstances that the time interval between two reading operations is not smaller than the second time threshold value, the read data of the later reading operation would cause the first read issue. In other words, the data read of the later reading operation at which the time interval between the reading operation and the former reading operation is not smaller than second time threshold value has a large amount of errors. It may be understood, if the time interval between the reading operation this time and the earlier reading operation (i.e., the latest reading operation performed before the reading operation this time), the reading operation this time would have the first read issue.

It should be indicated that, as described above, even if the time interval between two reading operations (e.g., the first reading operation and the second reading operation) is not smaller than the second time threshold, if the time interval between the previous writing operation (the last write operation performed before the first reading operation) and the first reading operation is smaller than the second time threshold value, the data read of the first reading operation does not generate a large amount of errors; that is, the first read issue does not occur. In other words, if the time interval between the reading operation performed to the target physical unit and the writing operation last performed to the target physical unit is smaller than the second time threshold value, the current reading operation does not occur the first read issue.

For example, as illustrated in the lower part of FIG. 5, the threshold voltage distribution of the memory cell of the physical unit that occurs the first read issue is shifted to the left or to the right. Accordingly, if (in the first reading operation after a period of time) the predetermined reading voltages $V_0$ to $V_6$ in the predetermined reading voltage set is used to read data from the memory cell (that has the first read issue), error is caused to the determined bit state of the memory cell in the current reading operation having the first read issue, and the plurality of memory cells with the first read issue causes the corresponding read data occur uncorrectable error. That is to say, it is required that the processor 211 to adjust the predetermined reading voltages $V_0$ to $V_6$ to the reading voltages $V_0"$ to $V_6"$ so as to accurately read the memory cell in the retention state. That is, as shown in the lower part of FIG. 5, the voltage values of the reading voltages $V_0"$ to $V_6"$ after adjustment may be close to a voltage interval midline (as illustrated in dashed lines) of every two adjacent threshold voltage distributions.

In the embodiment, the plurality of reading voltage values of each of reading voltage set among the first to the eighth reading voltage sets corresponding to the target physical unit are calculated by the processor 211 according to the predetermined reading voltage set, the program erase cycle threshold value of the target physical unit, the first time value of the target physical unit and the second time value of the target physical unit and one compensation voltage value of the target physical unit.

More specifically, the processor 211 may calculate the compensation voltage value according to a voltage shift compensation table corresponding to the rewriteable non-volatile memory module, the first time value and the second time value. In other words, according to the first time value and the second time value of the target physical unit, the processor can look up in the voltage shift compensation table to obtain a first compensation voltage value and a second compensation voltage value corresponding to the first time value. The first compensation voltage value is used to adjust the reading voltage so that the adjusted reading voltage can be used for the memory cell that is in the retention state. The second compensation voltage is used to adjust the reading voltage so that the adjusted reading voltage can be used for the memory cell that has the first read issue.

In the embodiment, it can be known whether the target physical unit is wearing-out (i.e., determine whether the target physical unit has wearing-out issue) by comparing the program erase cycle value of the target physical unit with the program erase cycle threshold value. It can be known whether the target physical unit has the retention issue by comparing the first time value of the target physical unit with the first time threshold value. It can be known whether the target physical unit has the first read issue by comparing the second time value of the target physical unit with the second time threshold value. That is to say, according to the examples of FIGS. 3 and 4, the processor 211 can determine whether the target physical unit has one of the wearing-out issue, retention issue or first read issue or a combination thereof, and correspondingly select the suitable reading voltage set to perform reading operation according to the state (the issue(s) the target physical unit has) of the target physical unit.

For example, if the program erase cycle value of one target physical unit is lower than the program erase cycle threshold value, the first time value is lower than the first time threshold value and the second time value is lower than the second time threshold value, the processor 211 determines that the target physical unit does not has the wearing-out issue, retention issue and first read issue, and uses the predetermined reading voltage set to perform reading operation on the target physical unit. In the embodiment, the first reading voltage set $VS_1$ is a predetermined reading voltage set.

In another example, if the program erase cycle value of one target physical unit is not lower than the program erase cycle threshold value, the first time value is not lower than the first time threshold value and the second time value is not lower than the second time threshold value, the processor 211 determines that the target physical unit has the wearing-out issue, retention issue and first read issue at the same time, and uses the eighth reading voltage set to perform reading operation on the target physical unit. The processor 211 uses the first compensation voltage value corresponding to the retention issue, the second compensation voltage value corresponding to the first read issue and the third compensation voltage value corresponding to the wearing-out issue to adjust the predetermined voltage set to the eighth reading voltage set $VS_8$. Specifically, as described above, the first compensation voltage value can be looked up according to the first time value and the voltage shift compensation table, the second compensation voltage value can be looked up according to the second time value and the voltage shift compensation table, and the third compensation voltage value can be looked up according to the program erase cycle value and the voltage shift compensation table.

For example, the eighth reading voltage set $VS_8$ may be calculated by using the equation (1) below:

$$VS8_i = V0_i + V_{PECi} + V_{Ri} + V_{FRi} \quad (1)$$

Specifically, for TLC NAND memory, "i" is 0 to 6. (For MLC NAND memory, "i" is 0 to 2.) V0i is the first to the seventh predetermined reading voltage values (e.g., the predetermined reading voltage values $V_0$ to $V_6$ as shown in FIG. 5) of the predetermined reading voltage set. $V_{PECi}$ is the third compensation voltage value, which corresponds to one of the first to the seventh predetermined reading voltage values of the predetermined reading voltage set, looked up in the program erase cycle value. $V_{Ri}$ is the first compensation voltage value, which corresponds to one of the first to the seventh predetermined reading voltage values of the predetermined reading voltage set, looked up in the first time value. $V_{FRi}$ is the second compensation voltage value, which corresponds to one of the first to the seventh predetermined reading voltage values of the predetermined reading voltage set, looked up in the second time value.

For example, the calculation equation of the first (i=0) reading voltage value in the eighth reading voltage set $VS_8$ is $VS8_0 = V0_0 + V_{PEC0} + V_{R0} + V_{FR0}$. Specifically, $V0_0$ is a first predetermined reading voltage value $V_0$ of the predetermined reading voltage set.

In another example, since the second reading voltage set is used to read the target physical unit that has the first read issue only, the second reading voltage set $VS_2$ may be calculated via the following equation (2):

$$VS2_i = V0_i + V_{FRi} \quad (2)$$

In yet another example, since the third reading voltage set is used to read the target physical unit that has the retention issue only, the third reading voltage set $VS_3$ may be calculated via the following equation (3):

$$VS3_i = V0_i + V_{Ri} \quad (3)$$

In still another example, since the fourth reading voltage set is used to read the target physical unit that has the retention issue and the first read issue, the fourth reading voltage set $VS_4$ may be calculated via the following equation (4):

$$VS4_i = V0_i + V_{Ri} + V_{FRi} \quad (4)$$

In yet another example, since the fifth reading voltage set is used to read the target physical unit that has the wearing-out issue only, the fifth reading voltage set $VS_5$ may be calculated via the following equation (5):

$$VS5_i = V0_i + V_{PECi} \quad (5)$$

In still another example, since the sixth reading voltage set is used to read the target physical unit that has wearing-out issue and has the first read issue, the sixth reading voltage set $VS_6$ may be calculated via the following equation (6):

$$VS6_i = V0_i + V_{PECi} + V_{FRi} \quad (6)$$

In still another example, since the seventh reading voltage set is used to read the target physical unit that has the wearing-out issue and has the retention issue, the seventh reading voltage set $VS_7$ may be calculated via the following equation (7):

$$VS7_i = V0_i + V_{PECi} + V_{Ri} \quad (7)$$

It should be pointed out that the manufacturer can carry out experiments based on the characteristics of the memory cell of the memory module used in the storage device to calculate the third compensation voltage value, the first compensation voltage value and the second compensation voltage value that respectively correspond to the range of different program erase cycle values, the range of different first time values and the range of different second time values. Accordingly, after identifying the program erase cycle value, the first time value and the second time value of the target physical unit, the processor 211 can instantly calculate the corresponding target reading voltage set to perform reading operation on the target physical unit according to the predetermined reading voltage set and the first, the second and the third compensation voltage values of the target physical unit via the method described above. In this manner, the target reading voltage set adopted by the processor 211 corresponds to the shift state of the threshold voltage of the current target physical unit and allows the reading operation to be performed efficiently.

In summary, the data reading method and the storage controller provided by the embodiments of the invention is capable of identifying one target physical unit in the rewritable non-volatile memory module corresponding to the read command according to the received read command, and identifying the program erase cycle value, the first timestamp and the second timestamp of the target physical unit so as to directly use the reading voltage corresponding to the state of the target physical unit to read the target data from the target physical unit in the condition of performing one time of reading operation, thereby improving the efficiency and accuracy of data-reading operation.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A data reading method, adapted for a storage device disposed with a rewritable non-volatile memory module, wherein the rewritable non-volatile memory module comprises a plurality of physical units, the method comprising:
receiving a read command from a host system, wherein the read command instructs to read a target data;
identifying a target physical unit storing the target data stored in the rewritable non-volatile memory module according to the read command, and identifying a program erase cycle value, a first timestamp and a second timestamp of the target physical unit, wherein the first timestamp records a time at which the target physical unit is written last, and the second timestamp records a time at which the target physical unit is read last; and
selecting a target reading voltage set among a plurality of reading voltage sets according to the program erase cycle value, the first timestamp and the second timestamp of the target physical unit so as to use the target reading voltage set to read the target data from the target physical unit,
wherein every time when an erasing operation is performed on the target physical unit, adding one to the program erase cycle value of the target physical unit;
every time when an erasing operation is performed on the target physical unit, resetting the first timestamp of the target physical unit as a current time, and every time when a writing operation is performed on the target physical unit, updating the first timestamp as a time at which the target physical unit performs the writing operation; and
every time when an erasing operation is performed on the target physical unit, resetting the second timestamp of the target physical unit as a current time, and every time when a reading operation is performed on the target physical unit, updating the second timestamp as a time at which the target physical unit performs the reading operation,
wherein the step of selecting the target reading voltage set among the plurality of reading voltage sets according to the program erase cycle value, the first timestamp and the second timestamp of the target physical unit comprises:
using a difference value obtained by subtracting the first timestamp from a current time as a first time value;
using a difference value obtained by subtracting the second timestamp from the current time as a second time value; and
selecting the target reading voltage set among the reading voltage sets by comparing the program erase cycle value of the target physical unit with a program erase cycle threshold value, comparing the first time value with a first time threshold value, comparing the second time value with a second time threshold value, wherein the first time threshold is larger than the second time threshold value.

2. The data reading method according to claim 1, wherein, when the rewritable non-volatile memory module is a 3D NAND flash memory module or a vertical NAND flash memory module.

3. The data reading method according to claim 1, the step of selecting the target reading voltage set among the reading voltage sets by comparing the program erase cycle value of the target physical unit with the program erase cycle threshold value, comparing the first time value with the first time threshold value and comparing the second time value with the second time threshold value comprises:
if the program erase cycle value of the target physical unit is smaller than the program erase cycle threshold value, the first time value is smaller than the first time threshold value and the second time value is smaller than the second time threshold value, selecting a first reading voltage set among the reading voltages sets as the target reading voltage set;
if the program erase cycle value of the target physical unit is smaller than the program erase cycle threshold value and the first time value is smaller than the second time threshold value, selecting the first reading voltage set among the reading voltage sets as the target reading voltage set;
if the program erase cycle value of the target physical unit is smaller than the program erase cycle threshold value, the first time value is smaller than the first time threshold value and the second time value is not smaller than the second time threshold value, selecting a second reading voltage set among the reading voltage sets as the target reading voltage set;
if the program erase cycle value of the target physical unit is smaller than the program erase cycle threshold value, the first time value is not smaller than the first time threshold value, and the second time value is smaller than the second time threshold value, selecting a third reading voltage set among the reading voltages sets as the target reading voltage set;
if the program erase cycle value of the target physical unit is smaller than the program erase cycle threshold value, the first time value is not smaller than the first time threshold value, and the second time value is not smaller than the second time threshold value, selecting a fourth reading voltage set among the reading voltages sets as the target reading voltage set;
if the program erase cycle value of the target physical unit is not smaller than the program erase cycle threshold value, the first time value is smaller than the first time threshold value, and the second time value is smaller than the second time threshold value, selecting a fifth reading voltage set among the reading voltage sets as the target reading voltage set;
if the program erase cycle value of the target physical unit is not smaller than the program erase cycle threshold value, the first time value is smaller than the second time threshold value, selecting the fifth reading voltage set among the reading voltage sets as the target reading voltage set;
if the program erase cycle value of the target physical unit is not smaller than the program erase cycle threshold value, the first time value is smaller than the first time threshold value, and the second time value is not smaller than the second time threshold value, selecting a sixth reading voltage set among the reading voltage sets as the target reading voltage set;
if the program erase cycle value of the target physical unit is not smaller than the program erase cycle threshold value, the first time value is not smaller than the first time threshold value, and the second time value is smaller than the second time threshold value, selecting a seventh reading voltage set among the reading voltage sets as the target reading voltage set; and
if the program erase cycle value of the target physical unit is not smaller than the program erase cycle threshold value, the first time value is not smaller than the first time threshold value, and the second time value is not smaller than the second time threshold value, selecting an eighth reading voltage set among the reading voltage sets as the target reading voltage set.

4. The data reading method according to claim 3, the method further comprising:
calculating a compensation voltage value according to a voltage shift compensation table, the first time value and the second time value corresponding to the rewritable non-volatile memory module;
calculating a plurality of reading voltage values of each of the plurality of reading voltage sets according to a predetermined reading voltage set, the program erase cycle threshold value, the first time value and the second time value, and the compensation voltage value.

5. A storage controller, used for controlling a storage device disposed with a rewritable non-volatile memory module, and comprising:
a connection interface circuit, coupled to a host system;
a memory interface control circuit, coupled to the rewritable non-volatile memory module, wherein the rewritable non-volatile memory module comprises a plurality of physical units;
a processor, coupled to the connection interface circuit and the memory interface control circuit; and
a data management circuit, coupled to the processor, the connection interface circuit and the memory interface control circuit,
wherein the processor receives a read command from the host system, wherein the read command instructs to read a target data,
wherein the processor further identifies a target physical unit storing the target data stored in the rewritable non-volatile memory module according to the read command, and identifies a program erase cycle value, a first timestamp and a second timestamp of the target physical unit, wherein the first timestamp records a time at which the target physical unit is written last, and the second timestamp records a time at which the target physical unit is read last,
wherein the processor selects a target reading voltage set among a plurality of reading voltage sets according to the program erase cycle value, the first timestamp and the second timestamp of the target physical unit so as to use the target reading voltage set to read the target data from the target physical unit, wherein, every time when an erase operation is performed on the target physical unit, the processor adds one to the program erase cycle value of the target physical unit, wherein, every time when an erase operation is performed on the target physical unit, the processor resets the first timestamp as a current time, and every time when a writing operation is performed on the target physical unit, the processor updates the first timestamp as a time at which the target physical unit performs the writing operation, wherein, every time when an erasing operation is performed on target physical unit, the processor resets the second timestamp of the target physical unit as a current time, and every time when a reading operation is performed on the target physical unit, the processor updates the second timestamp as a time at which the target physical unit performs the reading operation, wherein, in the operation of selecting the target reading voltage set among the reading voltage sets according to the program erase cycle value, the first timestamp and the second timestamp of the target physical unit, the processor uses a difference value obtained by subtracting the first timestamp from a current time as a first time value;

the processor uses a difference value obtained by subtracting the second timestamp from the current time as a second time value; and the processor selects the target reading voltage set among the reading voltage sets by comparing the program erase cycle value of the target physical unit with a program erase cycle threshold value, comparing the first time value with a first time threshold value, and comparing the second time value and a second time threshold value, wherein the first time threshold value is larger than the second time threshold value.

6. The storage controller according to claim 5, wherein the rewritable non-volatile memory module is a 3D TLC NAND flash memory module or a vertical NAND flash memory module.

7. The storage controller according to claim 5, wherein in the operation of selecting the target reading voltage set among the reading voltage sets by comparing the program erase cycle value of the target physical unit with the program erase cycle threshold value, comparing the first time value with the first time threshold value, and comparing the second time value and the second time threshold value, if the program erase cycle value of the target physical unit is smaller than the program erase cycle threshold value, the first time value is smaller than the first time threshold value and the second time value is smaller than the second time threshold value, the processor selects a first reading voltage set among the reading voltage sets as the target reading voltage set;

if the program erase cycle value of the target physical unit is smaller than the program erase cycle threshold value and the first time value is smaller than the second time threshold value, the processor selects the first reading voltage set among the reading voltage sets as the target reading voltage set;

if the program erase cycle value of the target physical unit is smaller than the program erase cycle threshold value, the first time value is smaller than the first time threshold value and the second time value is not smaller than the second time threshold value, the processor selects a second reading voltage set among the reading voltage sets as the target reading voltage set;

if the program erase cycle value of the target physical unit is smaller than the program erase cycle threshold value, the first time value is not smaller than the first time threshold value and the second time value is smaller than the second time threshold value, the processor selects a third reading voltage set among the reading voltage sets as the target reading voltage set;

if the program erase cycle value of the target physical unit is smaller than the program erase cycle threshold value, the first time value is not smaller than the first time threshold value and the second time value is not smaller than the second time threshold value, the processor selects a fourth reading voltage set among the reading voltage sets as the target reading voltage set; wherein an average voltage value of the second reading voltage set is larger than an average voltage value of the first reading voltage set, an average voltage value of the first reading voltage set is larger than an average voltage set of the fourth reading voltage set, and an average voltage value of the fourth reading voltage set is larger than an average voltage value of the third reading voltage set;

if the program erase cycle value of the target physical unit is not smaller than the program erase cycle threshold value, the first time value is smaller than the first time threshold value and the second time value is smaller than the second time threshold value, the processor selects a fifth reading voltage set among the reading voltage sets as the target reading voltage set;

if the program erase cycle value of the target physical unit is not smaller than the program erase cycle threshold value and the first time value is smaller than the second time threshold value, the processor selects the fifth reading voltage set among the reading voltage sets as the target reading voltage set;

if the program erase cycle value of the target physical unit is not smaller than the program erase cycle threshold value, the first time value is smaller than the first time threshold value and the second time value is not smaller than the second time threshold value, the processor selects a sixth reading voltage set among the reading voltage sets as the target reading voltage set;

if the program erase cycle value of the target physical unit is not smaller than the program erase cycle threshold value, the first time value is not smaller than the first time threshold value and the second time value is smaller than the second time threshold value, the processor selects a seventh reading voltage set among the reading voltage sets as the target reading voltage set; and if the program erase cycle value of the target physical unit is not smaller than the program erase cycle threshold value, the first time value is not smaller than the first time threshold value and the second time value is not smaller than the second time threshold value, the processor selects an eighth reading voltage set among the reading voltage sets as the target reading voltage set, wherein an average voltage value of the sixth reading voltage set is larger than an average voltage value of the fifth reading voltage set, an average voltage value of the fifth reading voltage set is larger than an average voltage value of the eighth reading voltage set, and an average voltage value of the eighth reading voltage set is larger than an average voltage value of the seventh reading voltage set.

8. The storage controller according to claim 7, wherein the processor calculates a compensation voltage value according to a voltage shift compensation table, the first time value and the second time value corresponding to the rewritable non-volatile memory module, wherein the processor calculates a plurality of reading voltage values of each of the plurality of reading voltage sets according to a predetermined reading voltage set, the program erase cycle threshold value, the first time value and the second time value, and the compensation voltage value.

* * * * *